US007913044B1

(12) United States Patent
Desai et al.

(10) Patent No.: US 7,913,044 B1
(45) Date of Patent: Mar. 22, 2011

(54) EFFICIENT INCREMENTAL BACKUPS USING A CHANGE DATABASE

(75) Inventors: Asit Desai, San Ramon, CA (US); Richard Zulch, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 258 days.

(21) Appl. No.: 11/346,005

(22) Filed: Feb. 2, 2006

(51) Int. Cl.
*G06F 12/00* (2006.01)

(52) U.S. Cl. ................ 711/162; 711/161; 711/E12.103; 711/156

(58) Field of Classification Search ........................ None
See application file for complete search history.

(56) References Cited

U.S. PATENT DOCUMENTS

| | | | | |
|---|---|---|---|---|
| 6,101,585 | A * | 8/2000 | Brown et al. | 711/162 |
| 6,366,986 | B1 * | 4/2002 | St. Pierre et al. | 711/162 |

* cited by examiner

*Primary Examiner* — Reginald G Bragdon
*Assistant Examiner* — Baboucarr Faal
(74) *Attorney, Agent, or Firm* — Van Pelt, Yi & James LLP

(57) ABSTRACT

Efficient incremental backups using a change database is disclosed. Based at least in part on a file attribute it is determined that a file has changed since a previous backup. Change data is stored in a data structure additional to a file system with which a file is associated. Change data indicates the file has changed since the previous backup. The file attribute is configured to be reset, each time a file is backed up, to a value indicating the file has not changed. Storing the change data enables a backup operation performed subsequent to the file attribute being reset to determine that the file has changed since the previous backup.

25 Claims, 12 Drawing Sheets

EFFICIENT INCREMENTAL BACKUPS USING A CHANGE DATABASE

BACKGROUND OF THE INVENTION

Efficiencies can be realized for backup time and backup storage space by only storing copies of files that have changed since the last backup in the backup set. Modifications to a given file can be detected by comparing attributes or properties of the file including the last modification date and the file size. However, in some cases when an attribute or a property of a file (for example, a security setting) is changed, it does not change other attributes like the modification date and the file size. Also, in some cases an attribute or a property indicating a change has occurred is reset during the course of a first operation (for example, the archive bit is reset during or after a first backup), such that the change information intended to be represented and/or conveyed by attribute or property is lost once the first operation has been performed, making it unavailable to be used by a second, subsequent operation (for example, a second backup, e.g., to a different backup data set and/or storage location) to determine that the item has been changed. It would be useful in such cases to be able to detect and remember as long as needed that the files have changed, so that efficient incremental backups, including backups to two or more backup sets and/or destinations, can be performed.

BRIEF DESCRIPTION OF THE DRAWINGS

Various embodiments of the invention are disclosed in the following detailed description and the accompanying drawings.

DETAILED DESCRIPTION

Figure 1:
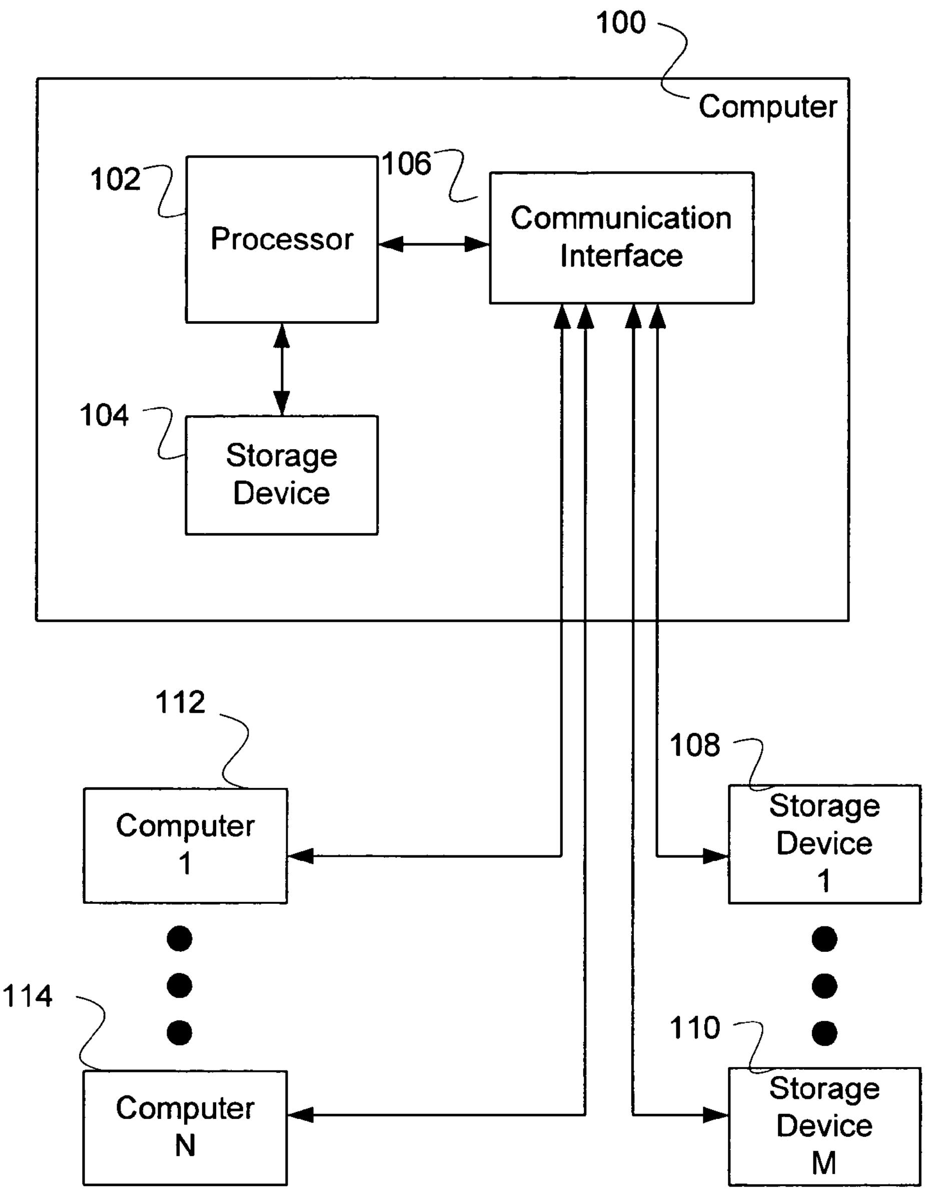
FIG. 1 illustrates an embodiment of a system for efficient incremental backups using a change database.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient incremental backups using a change database are disclosed. It is determined, based at least in part on a file attribute, or property, that a file has changed since a previous backup. A change identifier is stored in a data structure additional to the file system. In various embodiments, a data structure additional to the files system comprises a data structure in a separate location on a different file system, in unused portions of the file system, in extension fields provided by the file system, or in any other way such that the change identifier is not part of the original file system protocols. In some embodiments, the change identifier is stored in a custom attribute field of a file, and a system driver is used to access the change information from each file. Storing the change identifier enables a backup operation performed subsequent to a first backup operation to determine that the file has changed since the previous backup, even if the file attribute is configured to be reset, each time a file is backed up, to a value indicating the file has not changed. In some embodiments, the change comprises a change in security settings for the file. In some embodiments, an archive bit is used to detect a change in a file, such as a change in security setting, where the archive bit is reset once a backup is completed. In various embodiments, the change identifier identifies a file version, a session, or a number of times that or the session in which files have changed is an attribute or property in a change tree. In some embodiments, a change identifier indicates the number of sessions in which the file attribute has changed for any one or more files comprising a volume with which the file is associated. In some embodiments, the changed file is copied as part of an incremental backup in a backup set.

FIG. 1 illustrates an embodiment of a system for efficient incremental backups using a change database. In the example shown, computer 100 includes processor 102 for executing the instructions relevant to the system for efficient incremental backups using a change database, storage device 104 for storing instructions for processor 102, and communication interface 106 capable of connecting to one or more computers and to one or more storage devices. In some embodiments, computer 100 comprises a backup server. In various embodiments, communication interface 106 to the one or more computers and the one or more storage devices includes a local area network interface, a wide area network interface, an Ethernet interface, and/or a World Wide Web interface. The plurality of computers (represented in FIG. 1 by first computer 112 and $n^{th}$ computer 114) contain files/directories that may need to be backed up or may contain storage devices (e.g., disk drives) that are used to hold backup data. The plurality of storage devices (represented in FIG. 1 by first storage device 108 and $m^{th}$ storage device 110) may contain files/directories that may need to be backed up or may comprise storage devices and/or be associated with removable or other storage media that are used to hold backup data. In some embodiments, communication interface 106 connects to no computers. In some embodiments, communication interface 106 connects to no storage devices. In some embodiments, computer 100 is configured perform an incremental backup of one or more of computers 112-114 and/or storage devices 108-110. In some embodiments, all or part of the backup data that is incrementally backed up by computer 100 may be associated with source data associated with computer 100. In some embodiments, the backup data that is backed up may itself reside on computer 100, e.g., on a hard drive.

Figure 2:
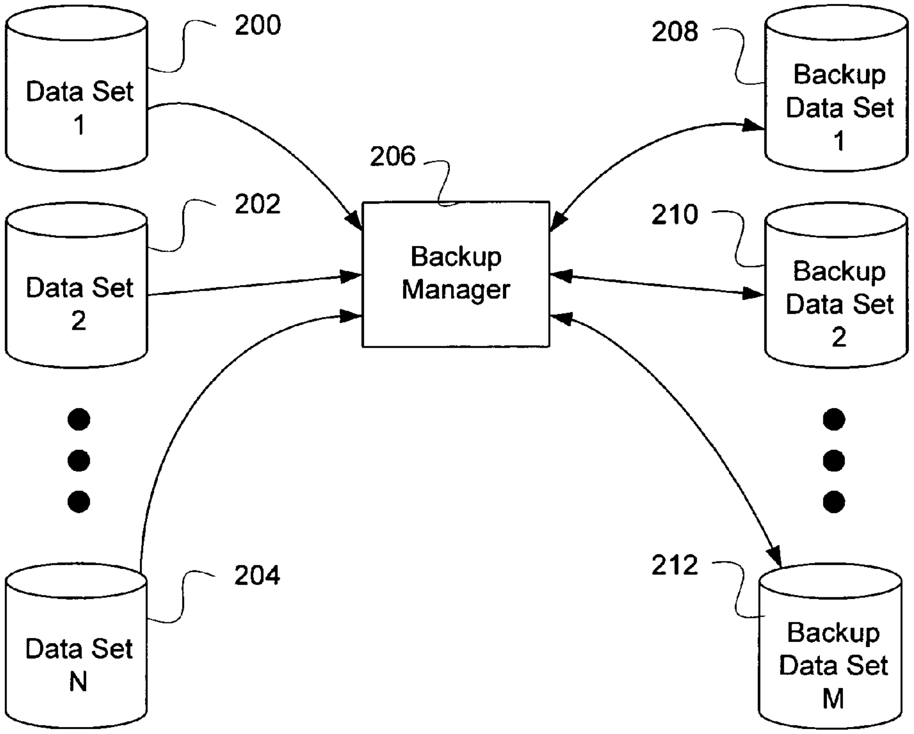
FIG. 2 illustrates an embodiment of a system for efficient incremental backups using a change database.

FIG. 2 illustrates an embodiment of a system for efficient incremental backups using a change database. In the example shown, a plurality of data sets (represented in FIG. 2 by first data set 200, second data set 202, and $n^{th}$ data set 204) are processed by backup manager 206 to create a plurality of backup data sets (represented in FIG. 2 by first backup data set 208, second backup data set 210, and $m^{th}$ backup data set 212). In the example shown, backup manager 206 also manages the plurality of backup data sets by performing incremental backups for the plurality of backup data sets. In other embodiments, incremental backups may be performed at least in part by a system or process other than a system or process used to create the backup data sets. In some embodiments, incremental backups may be performed with respect to a single backup data set comprising backup data associated with a single set of source data.

Figure 3:
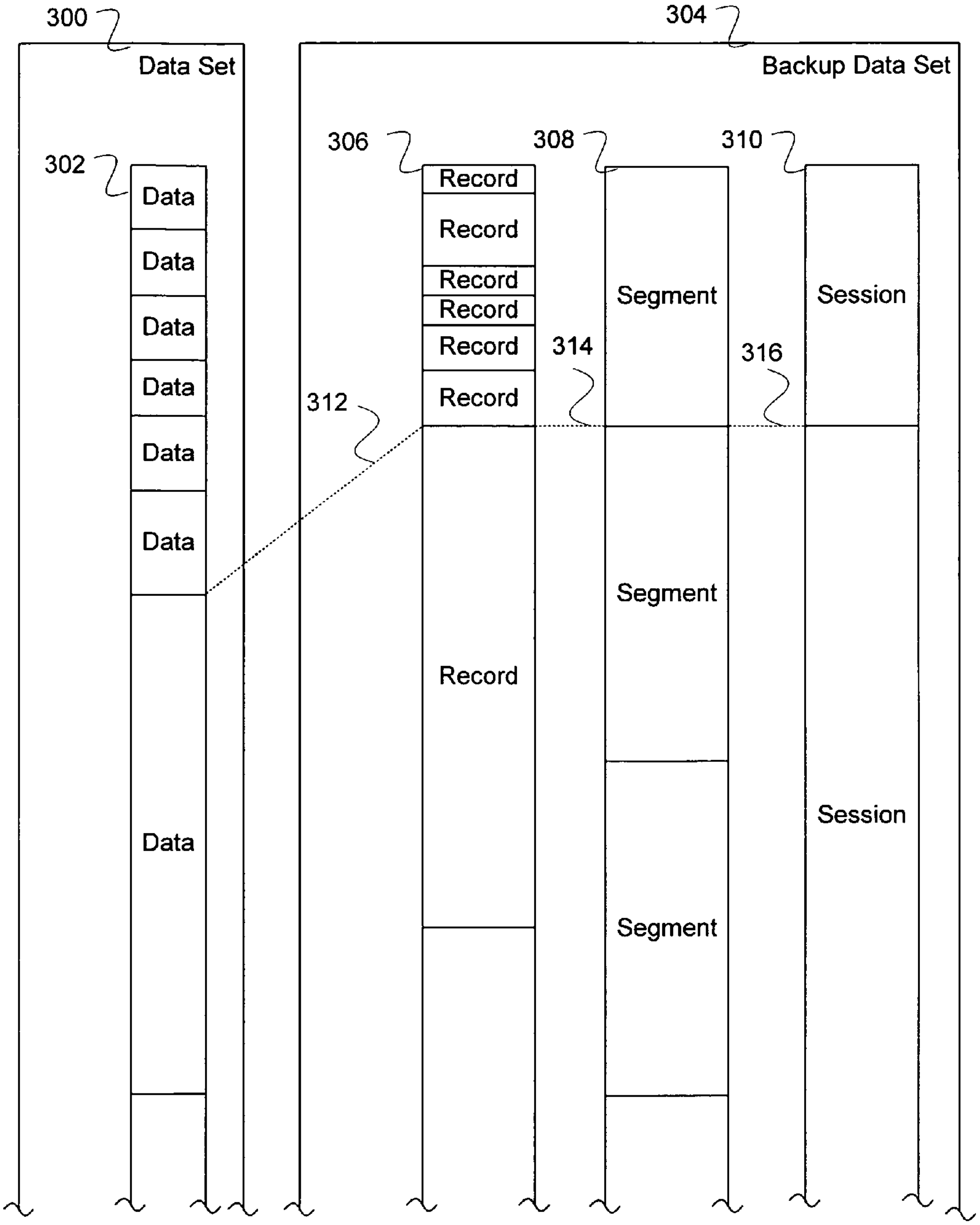
FIG. 3 illustrates an example of data organization in a source data set and a backup data set in one embodiment.

FIG. 3 illustrates an example of data organization in a source data set and a backup data set in one embodiment. In the example shown, data set 300 contains a plurality of data such as data 302. In some embodiments, data 302 comprises a file, a piece of a file, a directory, or a copy of a directory at a particular time. Backup data set 304 contains records corresponding to data in data set 300. For example, record 306 corresponds to data 302. Line 312 indicates a corresponding boundary between data in data set 300 and records in backup data set 304. Records can be smaller than data because the backup manager before storing the records uses data compression. Within backup data set 304 records are organized into sessions. Sessions are groups of backup data stored at the same time. Segment 308 contains record 306. Line 314 indicates a corresponding boundary between records and segments. Segments correspond to a contiguous piece of storage space. The end of a segment may be associated with the end of the backup (i.e. session), the end of the backup storage media, or a maximum limit size. In some embodiments, the maximum limit size is 600 megabytes. Sessions are stored in one or more segments. In the example shown, session 310 contains segment 308. Line 316 indicates a corresponding boundary between sessions and segments. A session may have more than one segment associated with it.

In some embodiments, a backup data set contains backup information in addition to backup data. Backup information may be stored in one or more records comprising a backup data set. In various embodiments, backup information may include a catalog of the contents of the backup set or data to recreate a catalog of the contents of the backup data set. In some embodiments the catalog includes one or more indexes of the source data set at particular backup times and the corresponding locations at which each element of source data is stored on backup media, also called a restore point index. In some embodiments, the backup information includes for each backup session (i.e., operation or event) session data identifying the data actually copied to backup media during the session. In some embodiments, if a file in the index of a data set at a particular backup time already exists in the backup data set because it had not changed from a previous backup, then the file is not stored again during the current backup session, and in some such embodiments the session data is associated with source data that has changed (or is new) since the last backup session. In some embodiments, a restore point index points to data in one or more sets of session data to indicate for each element of source data (e.g., each file and directory) the session(s) during which the element of source data as it existed at the time of the backup with which the restore point index is associated was stored. In some embodiments, the combination of the restore point index and the session data makes it possible to determine for each element of data associated with a restore point index the location on backup media of the corresponding backup data, which in turn makes it possible to use the backup data set to reconstruct the source data set in the form it existed at the time associated with the restore point index, e.g., at the time of a backup operation with which the restore point index is associated. The backup information stored with a backup data set may include other and/or different information about the backup data set, the source data set from which it originated, and/or the backup sessions through which the backup data set was generated.

Figure 4:
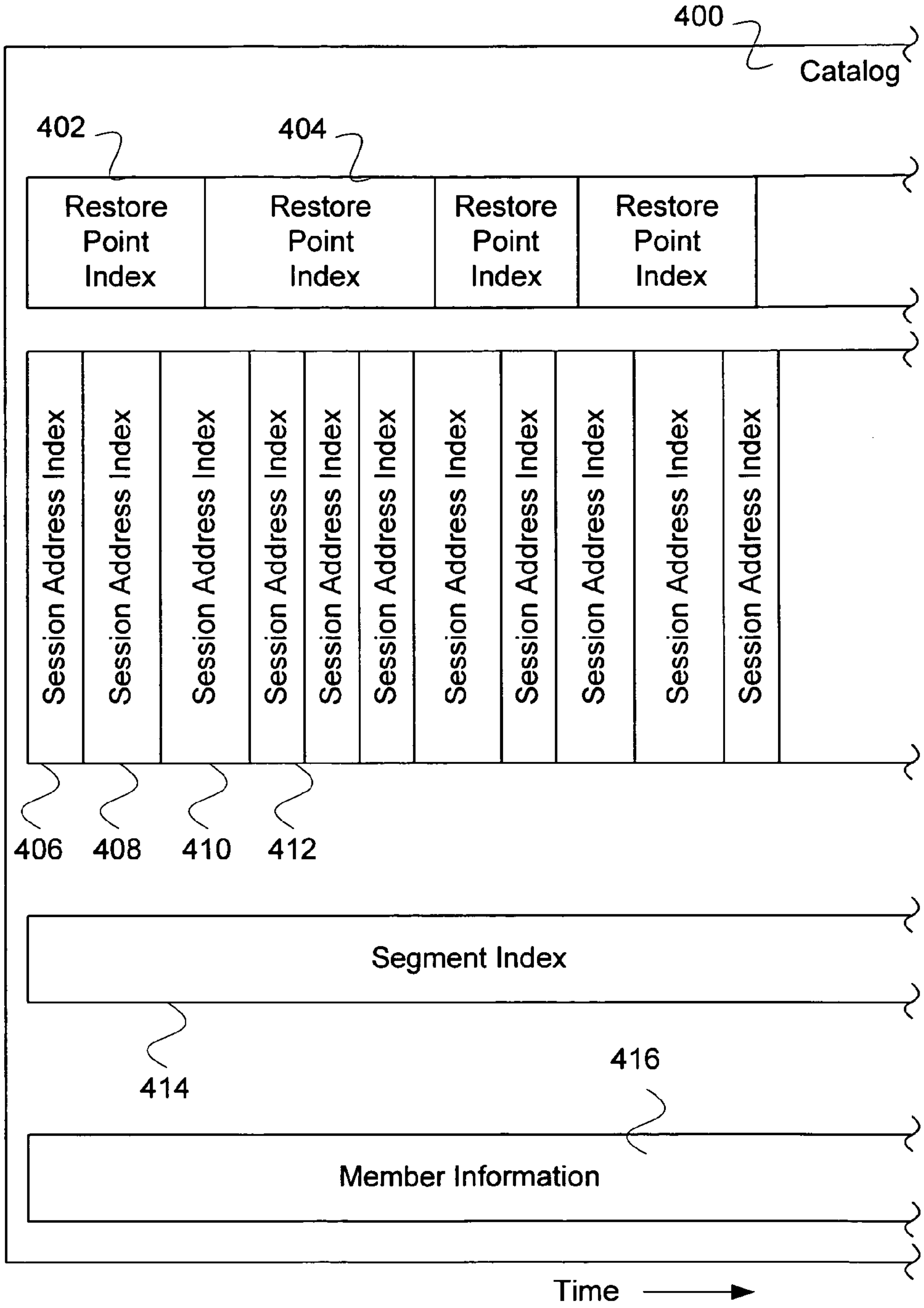
FIG. 4 illustrates an example of a catalog in one embodiment.

FIG. 4 illustrates an example of a catalog in one embodiment. In some embodiments, the catalog is similar to the catalog that can be found in U.S. Pat. No. 5,150,473 entitled DATA STORAGE FORMAT FOR ADDRESSABLE OR SEQUENTIAL MEMORY MEDIA filed Jan. 16, 1990, which is incorporated herein by reference. In the example shown, catalog 400 contains a plurality of restore point indexes and a plurality of session address indexes. As time passes, the number of restore point indexes and session address indexes increases. Restore point index 402 may point to files stored during a number of sessions. For example, restore point index 402 may point to files that are in session address index 406, session address index 408, and session address index 410. The session may not be before the restore point index time because, for example, during a verification step it was realized that a file was not properly saved to the backup set and so a save to the backup set is done subsequent to the session corresponding to the time of the restore point index. Subsequent restore point index 404 may point to files that are in session address index 406, session address index 410, and session address index 412 because, for example, the files indicated by restore point index 404 are no longer the same as any in session address index 408. Catalog 400 contains segment index 414. Segment index 414 is an index of addresses for the segments in the backup data set. In some embodiments, catalog 400 stores a session tree; for example, the session tree may be part of session address index 406.

Figure 5:
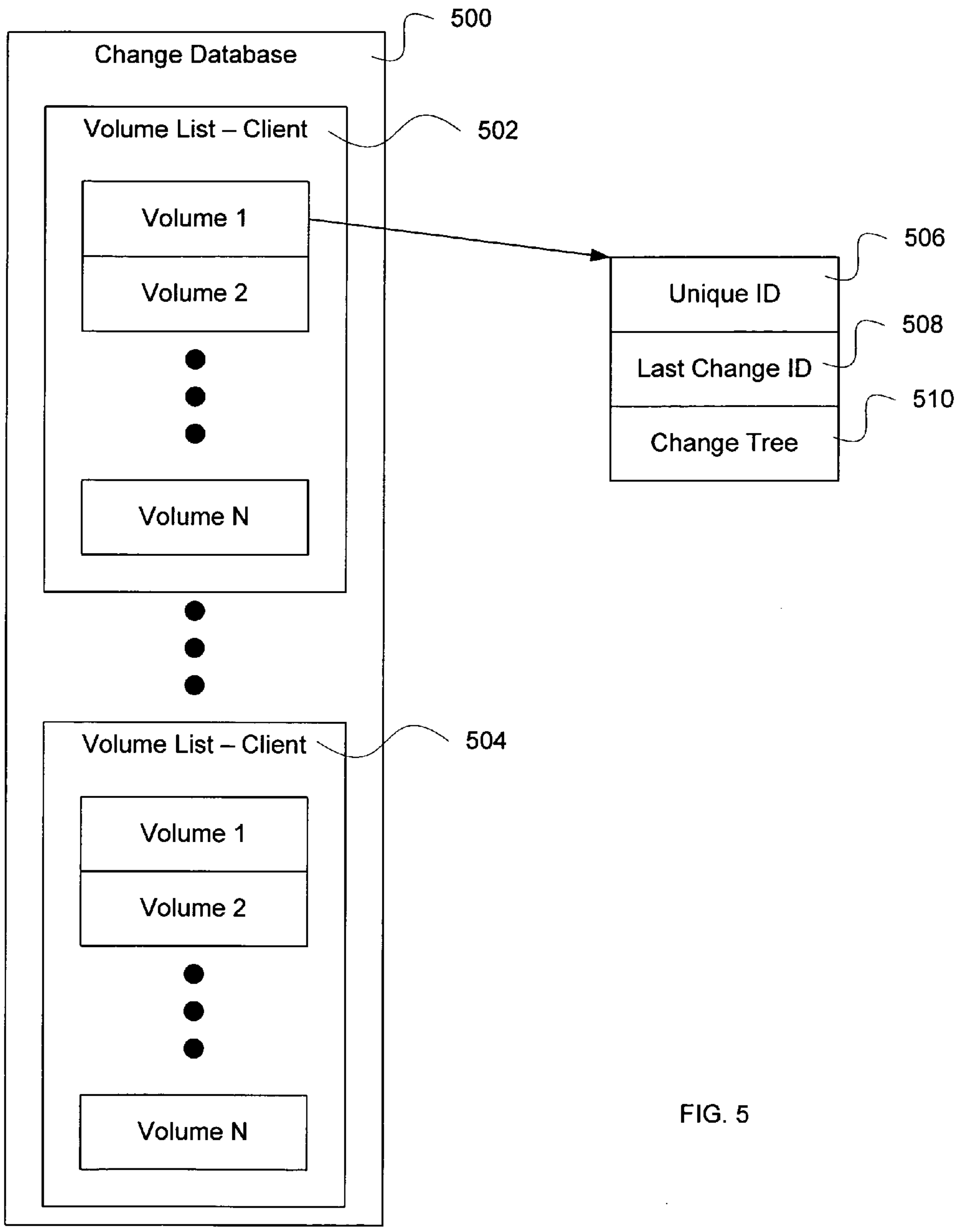
FIG. 5 illustrates an example of a change database in one embodiment.

FIG. 5 illustrates an example of a change database in one embodiment. In some embodiments, change database 500 is stored as a configuration file on the volume which has the attribute that resets—for example, clientname.dat or for local volumes as MyComputer.dat. In some embodiments, the change database is stored on a backup server, such as computer 100 in FIG. 1. In the example shown, change database 500 includes a volume list for each client, which is represented in FIG. 5 by volume list-client 502 and 504. Volume list-client 502 includes the volumes of a client, which is represented in the FIG. 5 by volume 1, volume 2, and volume N. Similarly, volume list-client 504 includes the volumes of a client, which is also represented in the FIG. 5 by volume 1, volume 2, and volume N. For each volume, information stored includes unique ID 506, last change ID 508, and change tree 510. Unique ID 506 allows identification of the volume; often volumes are named something like "C:" and this does not allow for precise identification of a volume associated with a given client. Last change ID 508 is the last value of the change ID for that volume. In some embodiments, last change ID 508 is the count of the number of times an attribute or property, such as a security value or archive bit, has changed on the whole volume. In some embodiments, a change identifier indicates the number of sessions in which the file attribute has changed for any one or more files comprising a volume with which the file is associated. In some embodiments, a change identifier indicates the session in which the file attribute changed. In some embodiments, last change ID 508 is the session count for the backup set. Change tree 510 contains information regarding the files in the file system of the volume and the change ID associated with each file and/or directory in the file system. In some embodiments, change tree 510 is used to help identify the files that have changed since the last backup in a backup set, even if an attribute or property that resets after a backup has been reset by another process—for example, the archive bit—or the particular change is not reflected in an attribute that is commonly checked to detect that a file has been changed—for example, security settings which do not change the file modification date or file size.

Figure 6:
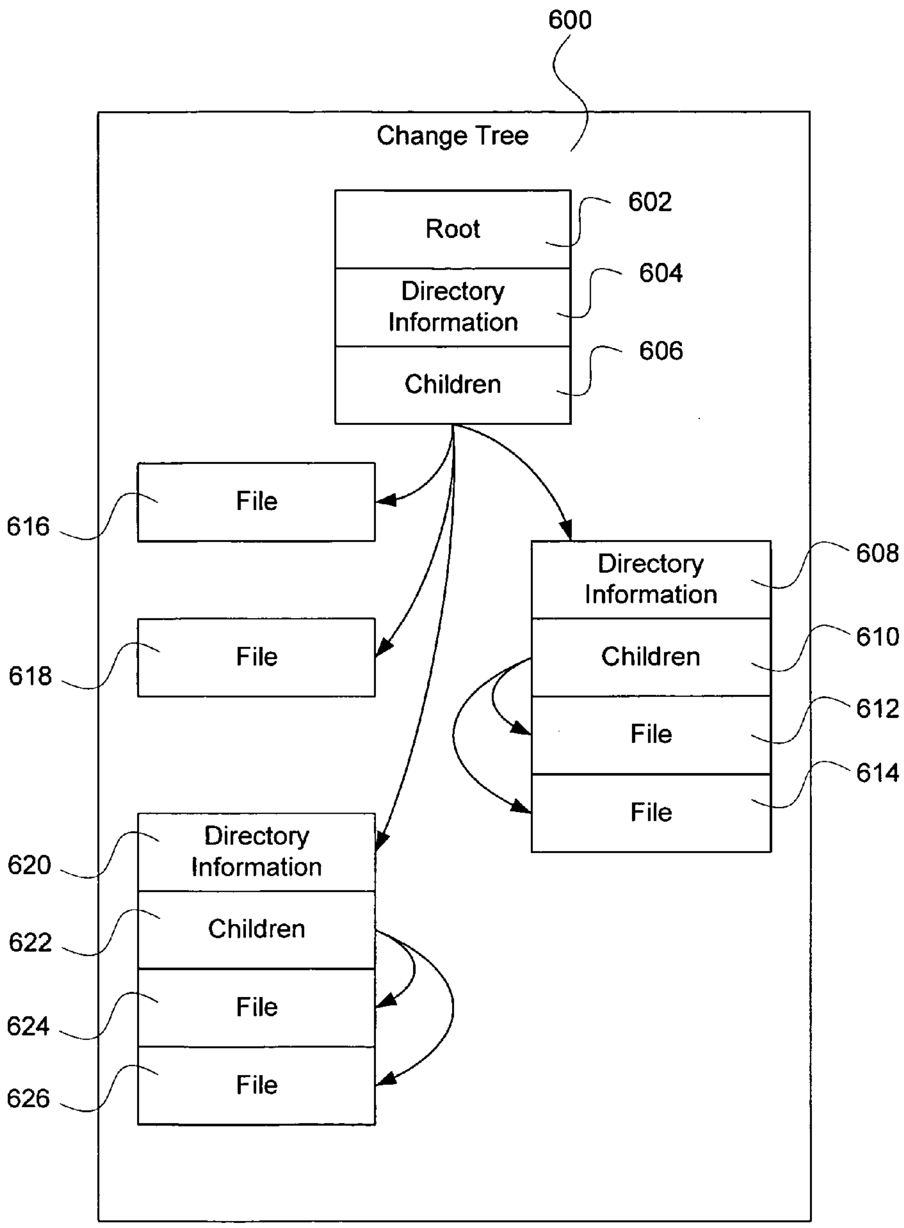
FIG. 6 illustrates a change tree in one embodiment.

FIG. 6 illustrates a change tree in one embodiment. In some embodiments, the change tree in FIG. 6 is used to implement change tree 510 in FIG. 5. In the example shown, change tree 600 includes root 602, directory information 604, and children 606. Root 602 includes stored information regarding the root of the volume and directory information 604 includes stored information regarding the top level directory of the volume. Children 606 includes stored information regarding the files and directories in the top level directory, which are represented in FIG. 6 by file 616 and 618 and directory information 620 and 608. File 616 and 618 includes stored information such as change ID values. Directory 620 and 608 includes stored information regarding the subdirectories 620 and 608. Children 610 and 622 include stored information regarding the files and directories in directory 608 and 620, respectively. File 612 and 614 represent files in directory 608 that are referred to by children 610 in FIG. 6. Similarly, file 624 and 626 represent files in directory 620 that are referred to by children 622 in FIG. 6. File 612, 614, 624 and 626 includes stored information such as change ID values. In some embodiments, change ID values stored in File 612, 614, 616, 618, 624, and 626 enable the detection of a change to a file in a volume. In some embodiments, the change comprises a change in the security settings of a file which does not change attributes such as modification date or file size but does set the archive bit. In some embodiments, the change comprises a setting of an archive bit that is reset after a backup making it difficult to track changes that occur to the file if more than one backup set is being used to backup the volume; if backup set A is used for a first backup and the archive bit of a file is reset, then when backup set B is used for a second backup, the archive bit will not be set and without the change database it would not be possible to detect that the file had changed, as indicated by the setting of the archive bit before the first backup.

Figure 7:
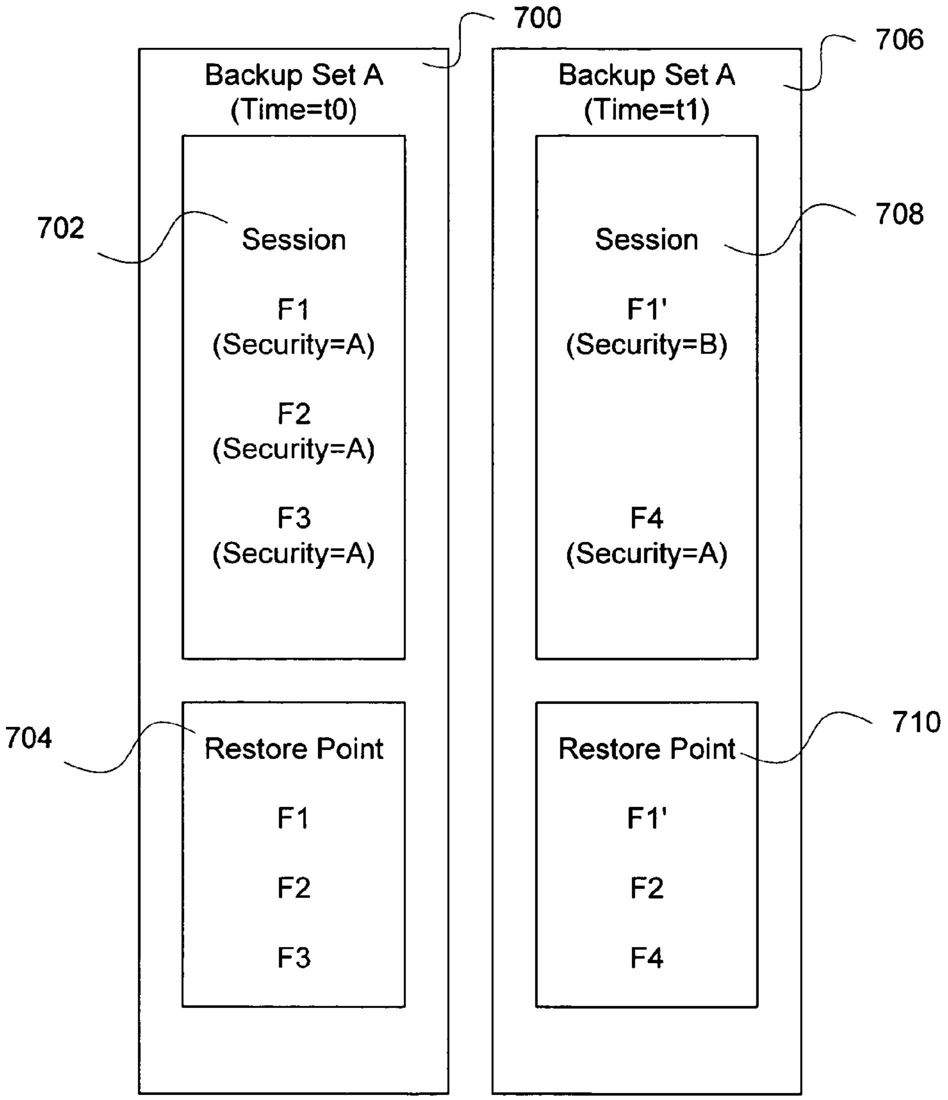
FIG. 7 illustrates an example of a scenario using a change database for efficient incremental backups.

FIG. 7 illustrates an example of a scenario using a change database for efficient incremental backups. In the example shown, backup set A 700 at time t0 includes session 702 information indicating that file F1 with security setting A, file F2 with security setting A, and file F3 with security setting A are part of session 702. Restore point 704 includes information that files F1, F2, and F3 are the files that exist at time t0. Backup set A 706 at time t1 include session 708 information indicating that file F1' with security setting B and file F4 with security setting A are part of session 708, where F1' is the same as F1 except that its security setting has changed. Restore point 710 includes information that files F1', F2, and F4 are the files that exist at time t1 (e.g., because file F3 has been deleted and file F4 created/added since the backup at t0). In some embodiments, the change in security setting is captured by checking the archive bit of the file F1. In this case, the archive bit gets set by the operating system after the security setting has changed so that the file F1' and/or data associated with file F1', such as its security setting, is stored for the incremental backup at time t1 as indicated by its presence in the session information. However, if there had been an additional incremental backup to a backup set B that took place between time t0 and time t1 (but after the security setting has changed for file F1), then the archive bit would have been cleared for file F1 and then at time t1, there would be no indication that file F1 had changed, which typically would result in the file F1 and/or associated security and/or other data being omitted from the backup to Set A performed at t1, even though file F1 and/or associated data had changed. Using a change tree or other data structure to detect and remember for use by a subsequent process that a file has been changed, even if the attribute, property, or other data indicating that a change has occurred has been reset, deleted, or otherwise altered or lost, is disclosed. In some embodiments, a change in security setting is captured by checking the archive bit of a file such as file F1 and storing the fact that the setting has changed by setting a change ID associated with the changed file in a change database to a value indicating, e.g., usable to determine, that the file has been changed. Using such an approach, as described more fully below, would ensure that file F1' and/or associated data is included in the backup to set A performed at t1, regardless of whether an archive bit or other change-indicating attribute of file F1 is reset as a result of backup set B being incrementally backed up at a time between t0 and t1, because the change database will indicate that the file has changed since the last incremental backup to backup set A.

Figure 8:
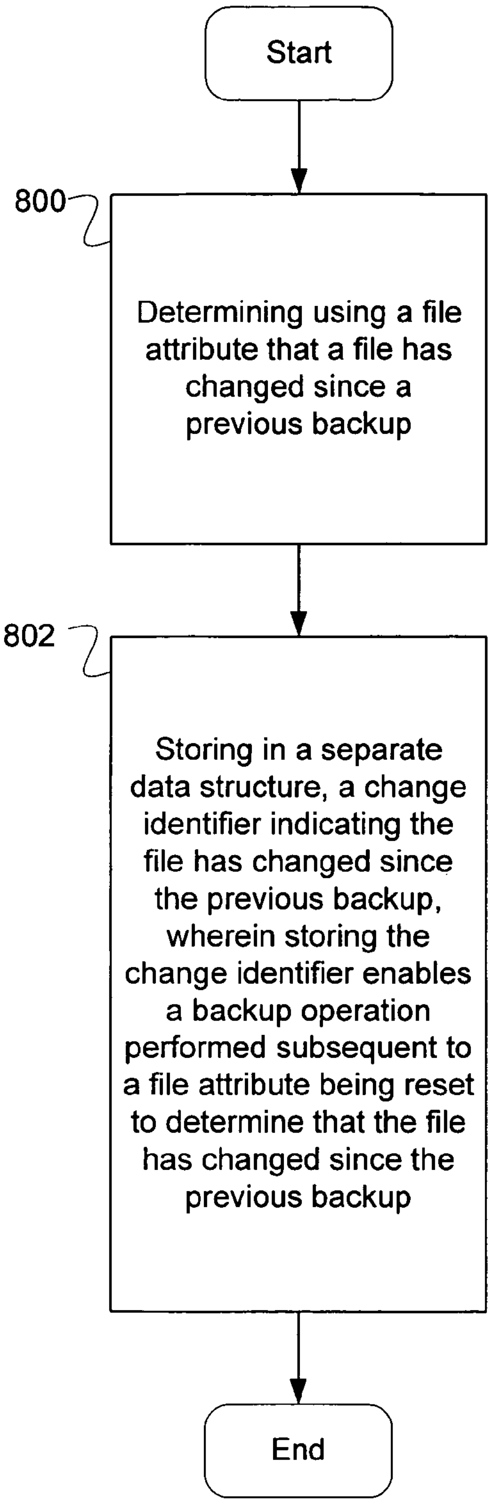
FIG. 8 is a flow diagram illustrating an embodiment of a process for efficient incremental backups using a change database.

FIG. 8 is a flow diagram illustrating an embodiment of a process for efficient incremental backups using a change database. In the example shown, in 800 it is determined if a file has changed since a previous backup. In some embodiments, the determination that a file has changed since a previous backup is based at least in part on a file attribute. In some embodiments, the file attribute comprises a security setting. In some embodiments, the file attribute comprise an archive bit, e.g., an archive bit in a computer using the Microsoft™ Windows NT™ operating system. In 802, if it is determined in 800 that the file has changed, a change identifier indicating that the file has changed since the previous backup is stored in a separate data structure, in a location associated with the file. Storing the change identifier enables a backup operation performed subsequent to the file attribute being reset (e.g., if the archive bit has been reset or cleared after a first backup operation performed subsequent to the previous backup with respect to which a further subsequent incremental backup is to be performed) to determine that the file has changed since the previous backup. In some embodiments, the data structure is additional to the file system. In various embodiments, the data structure is in a separate location on a different file system, in unused portions of the file system, in extension fields provided by the file system, or in any other way such that the change identifier which is stored in the data structure is not part of the original file system protocols. In some embodiments, a change identifier is stored in a custom attribute field of the file, and a system driver is used to access the change information of the file. In some embodiments, the previous backup is part of a backup set. In some embodiments, there are more than one backup set that are used to back up the file. In some embodiments, a file attribute such as an archive bit is configured to be reset each time a file is backed up. In some embodiments, indicating that the file has changed since the previous backup indicates that the file should be copied as part of an incremental backup.

Figure 9:
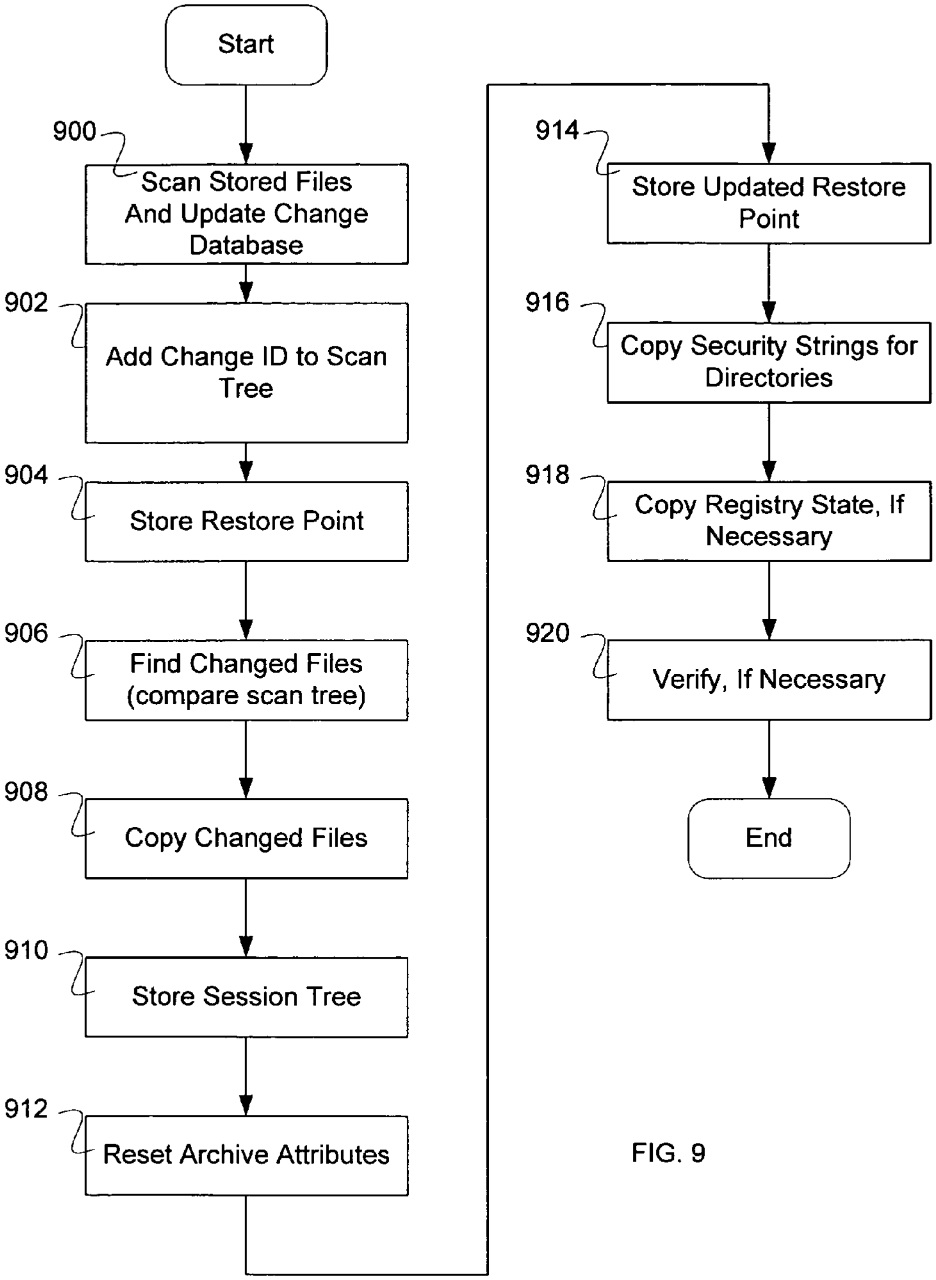
FIG. 9 is a flow diagram illustrating an embodiment of a process for efficient incremental backups using a change database.

FIG. 9 is a flow diagram illustrating an embodiment of a process for efficient incremental backups using a change database. In the example shown, in 900 stored files are scanned. In some embodiments, a scan tree is generated using the information found during the scanning of the stored files. In some embodiments, the files stored in volumes that are designated to be backed up as part of a backup set are scanned to locate all the files. In some embodiments, a change tree is generated using the information that is discovered during the scanning of the stored files. In some embodiments, if an attribute that can be reset, of a file (for example, an archive bit) is identified as being set during the scanning of stored files, then the file is added to a change tree, if necessary, and a the change ID for the file in the change tree is set.

In 902, the change ID is added to the scan tree. In some embodiments, the change ID is added to the scan tree by scanning all the files in the volumes that are to be part of the backup set to determine if there have been any changes to the files since a previous backup in the backup set and storing for each file that has changed an indicator that the file has changed (for example, the change ID). In some embodiments, the change to a file is detected by examining the change ID in the change tree, which stores a value when a file has changed as indicated by an attribute that can be reset, such as an archive bit associated with a file, or comparing an attribute or property with a previously stored version of that attribute or property (in the change database) that indicates that the file has changed since the last backup. In some embodiments, the change ID in the change tree is compared to the change ID value for the current session in order to determine if there has been a change since the last backup in the backup set. In some embodiments, updating the scan tree is performed using the information that is in the change tree, e.g., by accessing, updating, comparing, analyzing, or otherwise using and/or adding to the data stored in the change tree.

In 904, a restore point is stored. In some embodiments, the stored restore point enables the backup system to restore the files to the state as they existed at the time of the backup that stores the restore point. In 906 changed files are found. In some embodiments, changed files are found by comparing attributes or properties of a file as compared to previously stored versions in a backup set by comparing the current scan tree with a stored scan and/or session tree representing the state of the file system at the time of a previous backup(s) with respect to which a current incremental backup is being performed. In some embodiments, a session tree is generated using the information generated by comparing the current and the stored scan tree, where the session tree describes the files that are to be stored during the current session.

In 908, the changed files are copied. In some embodiments, the changed files as described by the session tree are stored in the backup set as part of the incremental backup. In 910, the session tree is stored. In some embodiments the session tree is stored in the catalog of the backup set. In 912 the archive attributes of the files are reset. In 914, an updated restore point is stored. In some cases files have changed since the beginning of the backup process. In this case, files that were modified again during the backup period are updated so that the restore point indicates the most recent modification date and/or time. In 916, security settings are stored for the directories. In some embodiments, directory security settings will be stored in the same manner as file security settings. In some embodiments, a copy of the change database is stored in the backup set so that state of the change database can be restored if the system storage becomes corrupted. In 918, a copy of the registry is stored, if necessary. In some cases, the backup system stores the client system state in order to better capture the state of the client at the time of the incremental backup. In 920, a verify operation is performed, if necessary. In some embodiments, a selectable verify operation verifies the contents of the stored files for the session with the files on the client to insure that there has been no data corruption during the backup process.

Figure 10:
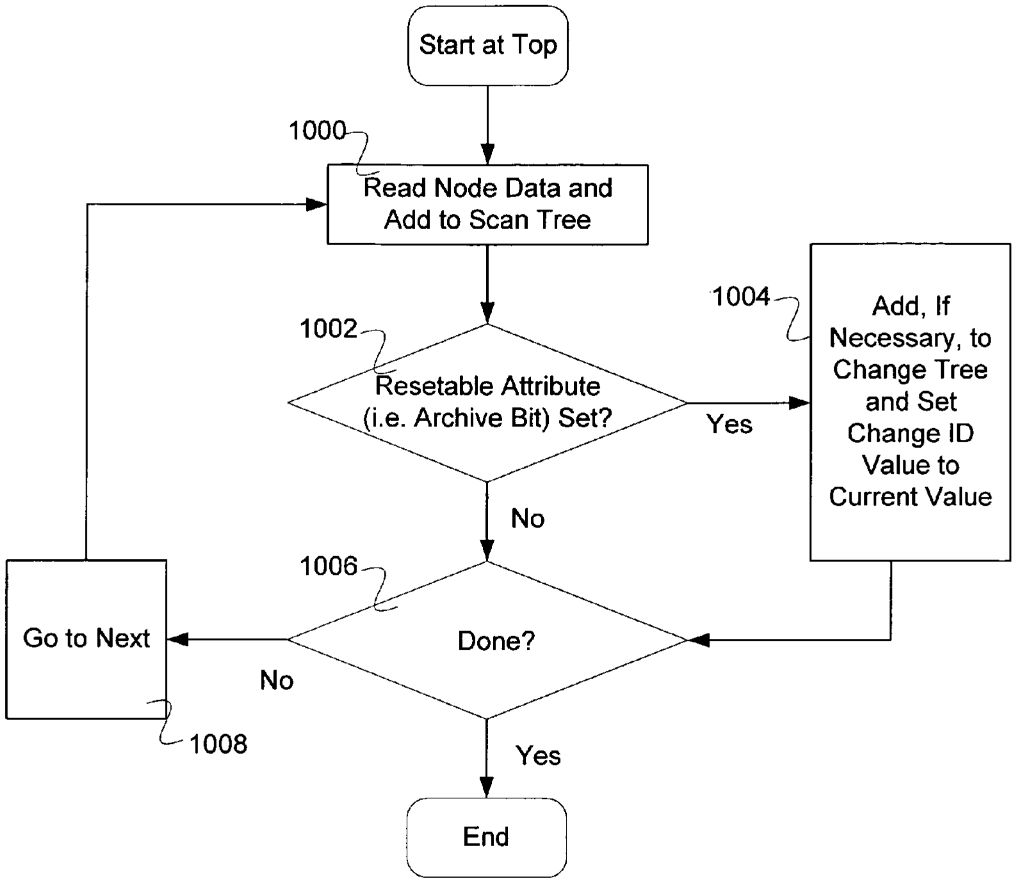
FIG. 10 is a flow diagram illustrating an embodiment of a process for scanning stored files for efficient incremental backups using a change database.

FIG. 10 is a flow diagram illustrating an embodiment of a process for scanning stored files for efficient incremental backups using a change database. In some embodiments, the process of FIG. 10 is used to implement 900 of FIG. 9. The process starts at the top of a volume that is part of a back up. In 1000, node data is read and added to a scan tree. In some embodiments, the node data for example, file/directory information such as attributes, properties, and/or children associated with a directory are stored in the scan tree. In 1002, it is determined if an attribute or property associated with the file that is able to be reset (for example, an archive bit) is set. If it is set, then in 1004 the node is added to the change tree, if necessary (it may already exist in the change tree from a previous change), and a corresponding change ID having a value indicating that the file has been changed since a previous backup with respect to which the incremental backup is being performed is added to the scan tree and control passes to 1006. In various embodiments, the value of the change ID identifies the number of times or sessions in which the file has changed as indicated by an attribute or property that can be reset, the session in which the file has changed as indicated by an attribute or property that can be reset, a file version number, the number of sessions in which any file has changed as indicated by an attribute or property that can be reset, or any other value that enables the system to determine if the file has changed since the previous backup in the backup set as indicated by an attribute or property that can be reset. If it is not set, then control passes to 1006. In 1006, it is determined if the process is done. In some embodiments, the process is done when there are no more nodes to be scanned in the one or more volumes to be backed up. If the process is not done, then the next node is selected and control passes to 1000. If the process is done, then the process ends.

Figure 11:
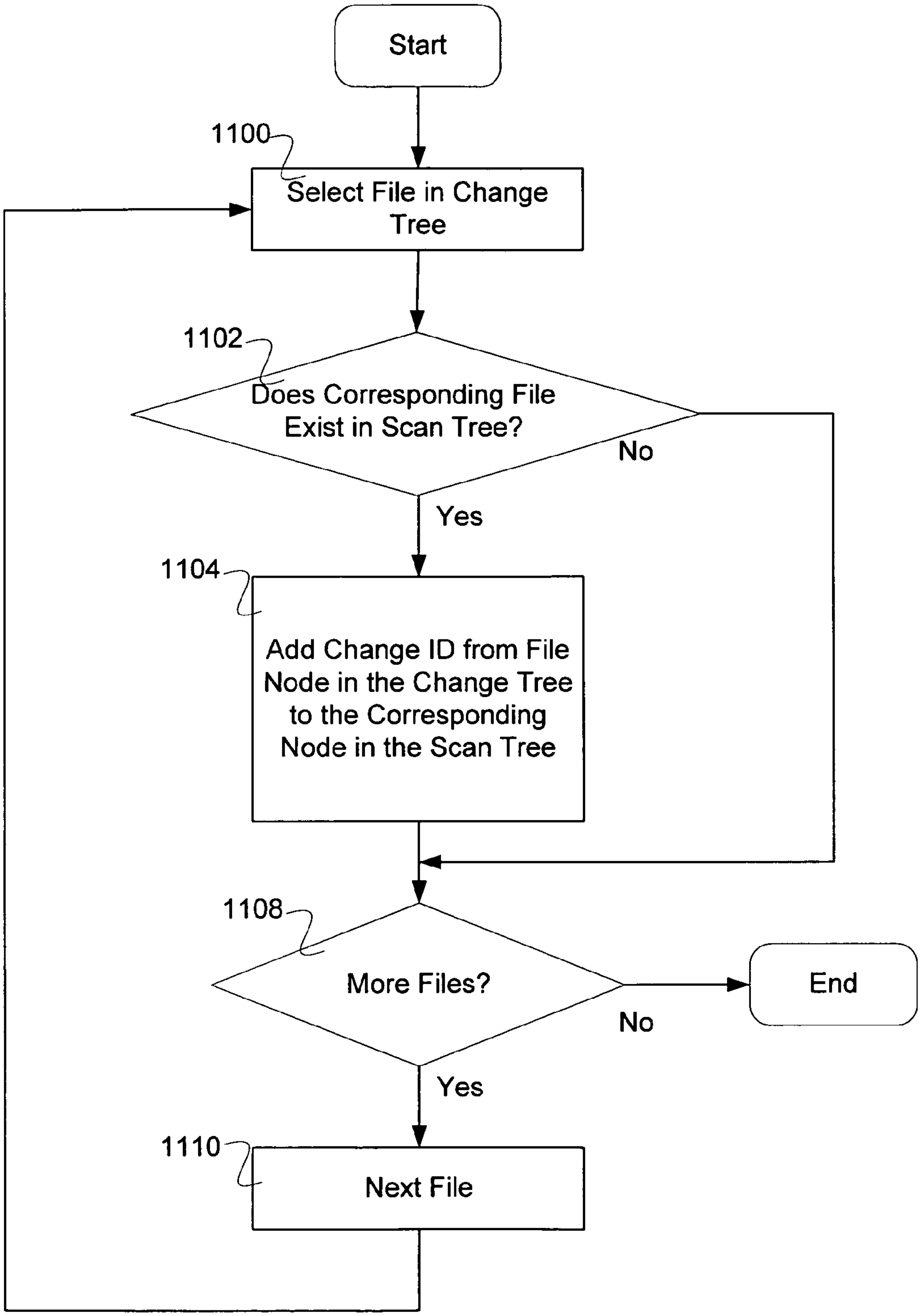
FIG. 11 is a flow diagram illustrating an embodiment of a process for updating a change ID in the scan tree for efficient incremental backups using a change database.

FIG. 11 is a flow diagram illustrating an embodiment of a process for updating a change ID in the scan tree for efficient incremental backups using a change database. In some embodiments, the process of FIG. 11 is used to implement 902 in FIG. 9. In 1100, a file is selected in the change tree. In 1102, it is determined if the corresponding file exists in the scan tree. If the corresponding file is found in the scan tree, then in 1104 the change ID from the file node in the change tree is added to the corresponding file node in the scan tree. In some embodiments, the change ID indicates the number of sessions in which there has been a change indicated in the change database. If the scan tree file corresponding to the one in the change tree is not found, then control passes to 1108. In 1108, it is determined if there are more files to process. If there are not, the process ends. If there are, then the next file is selected in 1110 and control passes to 1100.

Figure 12:
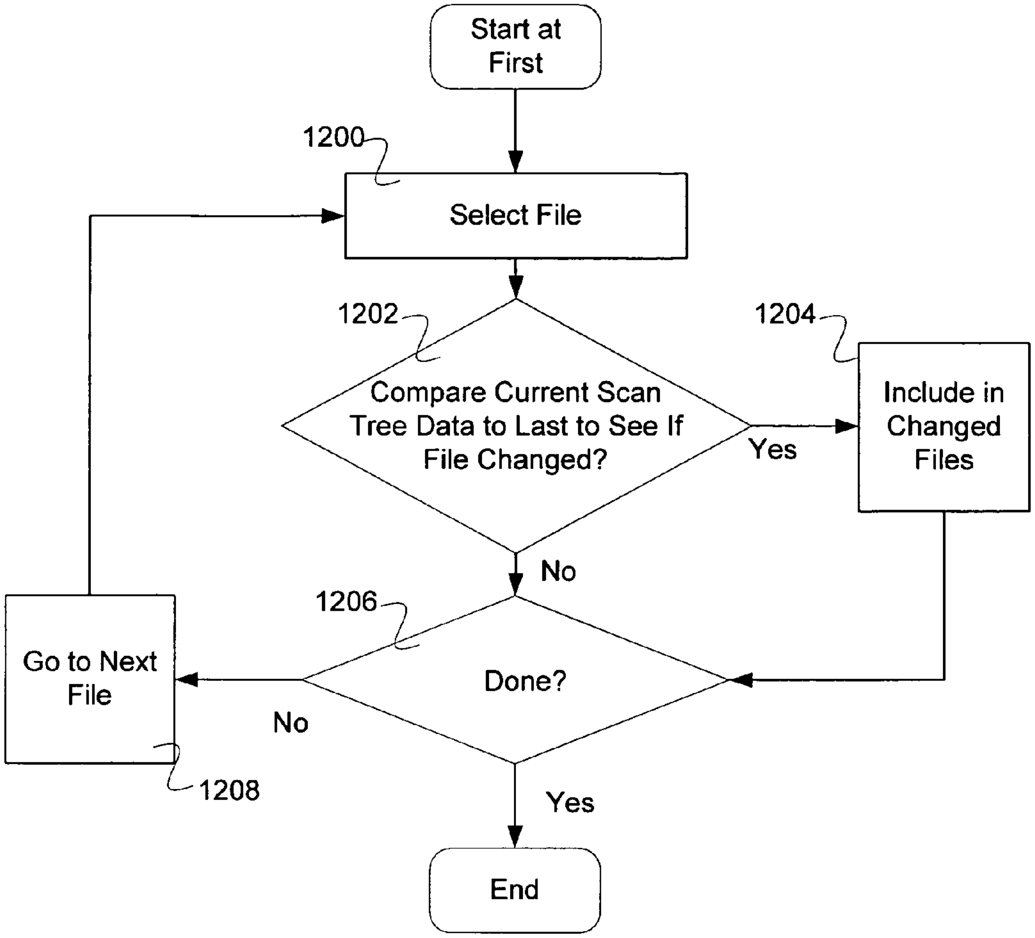
FIG. 12 is a flow diagram illustrating an embodiment of a process for finding changed files for efficient incremental backups using a change database.

FIG. 12 is a flow diagram illustrating an embodiment of a process for finding changed files for efficient incremental backups using a change database. In some embodiments, the process of FIG. 12 is used to implement 906 in FIG. 9. In 1200, a file is selected. In 1202, it is determined if the file has changed by comparing the current scan tree to a previous scan tree. In some embodiments, an attribute or property of a file (for example, the modify date, the file size, or any other appropriate attribute) or the change ID in the change database are used to determine if a file has changed. If the file has changed, then in 1204 the file is included in the changed files and control passes to 1206. In some embodiments, the adding of a file to the change files includes adding the file to a session tree. If the file has not changed, control passes to 1206. In 1206, it is determined if the process is done. If the process is done, then the process ends. If the process is not done, then the next file is selected in 1208 and control passes to 1200. In some embodiments, the process is complete when all the files in the scan tree have been processed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for efficient incremental backups comprising:

determining based at least in part on an archive attribute of a file reflecting that a setting for the file has changed since a previous backup associated with a first backup set; and storing in a change database which is not part of an original file system protocol, a change data indicating the file has changed since the previous backup associated with the first backup set;

in the event a backup associated with a second backup set is performed, resetting the archive attribute to a value indicating that the file has not changed; and performing a backup associated with the first backup set, including by:

determining those files that have changed since the previous backup associated with the first backup set based at least in part on the change data stored in the change database and without considering the archive attribute; and storing those files determined to have been changed since the previous backup associated with the first backup set.

2. A method as in claim 1, wherein the change data comprises a change identifier that indicates the number of backup sessions in which the archive attribute has changed, wherein a backup session comprises a group of backup data stored at the same time.

3. A method as in claim 1, wherein the change data comprises a change identifier that indicates the number of backup sessions in which the archive attribute has changed for any one or more files comprising a volume with which the file is associated, wherein a backup session comprises a group of backup data stored at the same time.

4. A method as in claim 1, wherein the change data comprises a change identifier that indicates the backup session in which the archive attribute changed, wherein a backup session comprises a group of backup data stored at the same time.

5. A method as in claim 1, wherein the backup operation captures restore point information such that the file can be restored to the same state as when it was backed up.

6. A method as in claim 1, wherein performing the backup associated with the first backup set includes storing backup data on a first storage location and performing the backup associated with the second backup set includes storing backup data on a second storage location.

7. A method as in claim 1, wherein storing includes storing a change tree which reflects the file system hierarchy of a volume with which the file is associated, wherein each node in the change tree stores a change identifier for a corresponding node in the file system hierarchy of the volume.

8. A method as in claim 7, wherein determining those files that have changed since the previous backup associated with the first backup set includes comparing, for a given file, (1) a stored change identifier value which is stored in the change tree in the node corresponding to the given file and (2) a current change identifier value associated with the given file.

9. A method as in claim 1, wherein storing includes storing in at least one of the following: in an extension field provided by a file system or in custom attribute field of a file which is accessible via a system driver.

10. A non-transitory computer program product for efficient incremental backups, the computer program product being embodied in a computer readable storage medium and comprising computer instructions for:

determining based at least in part on an archive attribute of a file reflecting that a setting for the file has changed since a previous backup associated with a first backup set; and storing in a change database which is not part of an original file system protocol, a change data indicating the file has changed since the previous backup associated with the first backup set;

in the event a backup associated with a second backup set is performed, resetting the archive attribute to a value indicating that the file has not changed; and performing a backup associated with the first backup set, including by:

determining those files that have changed since the previous backup associated with the first backup set based at least in part on the change data stored in the change database and without considering the archive attribute; and storing those files determined to have been changed since the previous backup associated with the first backup set.

11. A non-transitory computer program product as in claim 10, wherein the change data comprises a change identifier that indicates the number of backup sessions in which the archive attribute has changed, wherein a backup session comprises a group of backup data stored at the same time.

12. A non-transitory computer program product as in claim 10, wherein the change data comprises a change identifier that indicates the number of backup sessions in which the archive attribute has changed for any one or more files comprising a volume with which the file is associated, wherein a backup session comprises a group of backup data stored at the same time.

13. A non-transitory computer program product as in claim 10, wherein the change data comprises a change identifier that indicates the backup session in which the archive attribute changed, wherein a backup session comprises a group of backup data stored at the same time.

14. A non-transitory computer program product as in claim 10, wherein the computer instructions for performing the backup associated with the first backup set include computer instructions for storing backup data on a first storage location and the computer instructions for performing the backup associated with the second backup set include computer instructions for storing backup data on a second storage location.

15. A non-transitory computer program product as in claim 10, wherein the computer instructions for storing include computer instructions for storing a change tree which reflects the file system hierarchy of a volume with which the file is associated, wherein each node in the change tree stores a change identifier for a corresponding node in the file system hierarchy of the volume.

16. A non-transitory computer program product as in claim 15, wherein the computer instructions for determining those files that have changed since the previous backup associated with the first backup set include computer instructions for comparing, for a given file, (1) a stored change identifier value which is stored in the change tree in the node corresponding to the given file and (2) a current change identifier value associated with the given file.

17. A non-transitory computer program product as in claim 10, wherein the computer instructions for storing include computer instructions for storing in at least one of the following: in an extension field provided by a file system or in custom attribute field of a file which is accessible via a system driver.

18. A system for efficient incremental backups comprising:

a processor; and a memory coupled with the processor, wherein the memory is configured to provide the processor with instructions which when executed cause the processor to:

determine based at least in part on an archive attribute of a file reflecting that a setting for the file has changed since a previous backup associated with a first backup set; and store in a change database which is not part of an original file system protocol, a change data indicating the file has changed since the previous backup associated with the first backup set;

in the event a backup associated with a second backup set is performed, reset the archive attribute to a value indicating that the file has not changed; and perform a backup associated with the first backup set, including by:

determining those files that have changed since the previous backup associated with the first backup set based at least in part on the change data stored in the change database and without considering the archive attribute; and storing those files determined to have been changed since the previous backup associated with the first backup set.

19. A system as in claim 18, wherein the change data comprises a change identifier that indicates the number of backup sessions in which the archive attribute has changed, wherein a backup session comprises a group of backup data stored at the same time.

20. A system as in claim 18, wherein the change data comprises a change identifier that indicates the number of backup sessions in which the archive attribute has changed for any one or more files comprising a volume with which the file is associated, wherein a backup session comprises a group of backup data stored at the same time.

21. A system as in claim 18, wherein the change data comprises a change identifier that indicates the backup session in which the archive attribute changed, wherein a backup session comprises a group of backup data stored at the same time.

22. A system as in claim 18, wherein the instructions for performing the backup associated with the first backup set include instructions for storing backup data on a first storage location and the instructions for performing the backup associated with the second backup set include instructions for storing backup data on a second storage location.

23. A system as in claim 18, wherein the instructions for storing include instructions for storing a change tree which reflects the file system hierarchy of a volume with which the file is associated, wherein each node in the change tree stores a change identifier for a corresponding node in the file system hierarchy of the volume.

24. A system as in claim 23, wherein the instructions for determining those files that have changed since the previous backup associated with the first backup set include instructions for comparing, for a given file, (1) a stored change identifier value which is stored in the change tree in the node corresponding to the given file and (2) a current change identifier value associated with the given file.

25. A system as in claim 18, wherein the instructions for storing include instructions for storing in at least one of the following: in an extension field provided by a file system or in custom attribute field of a file which is accessible via a system driver.

* * * * *